UNITED STATES PATENT OFFICE.

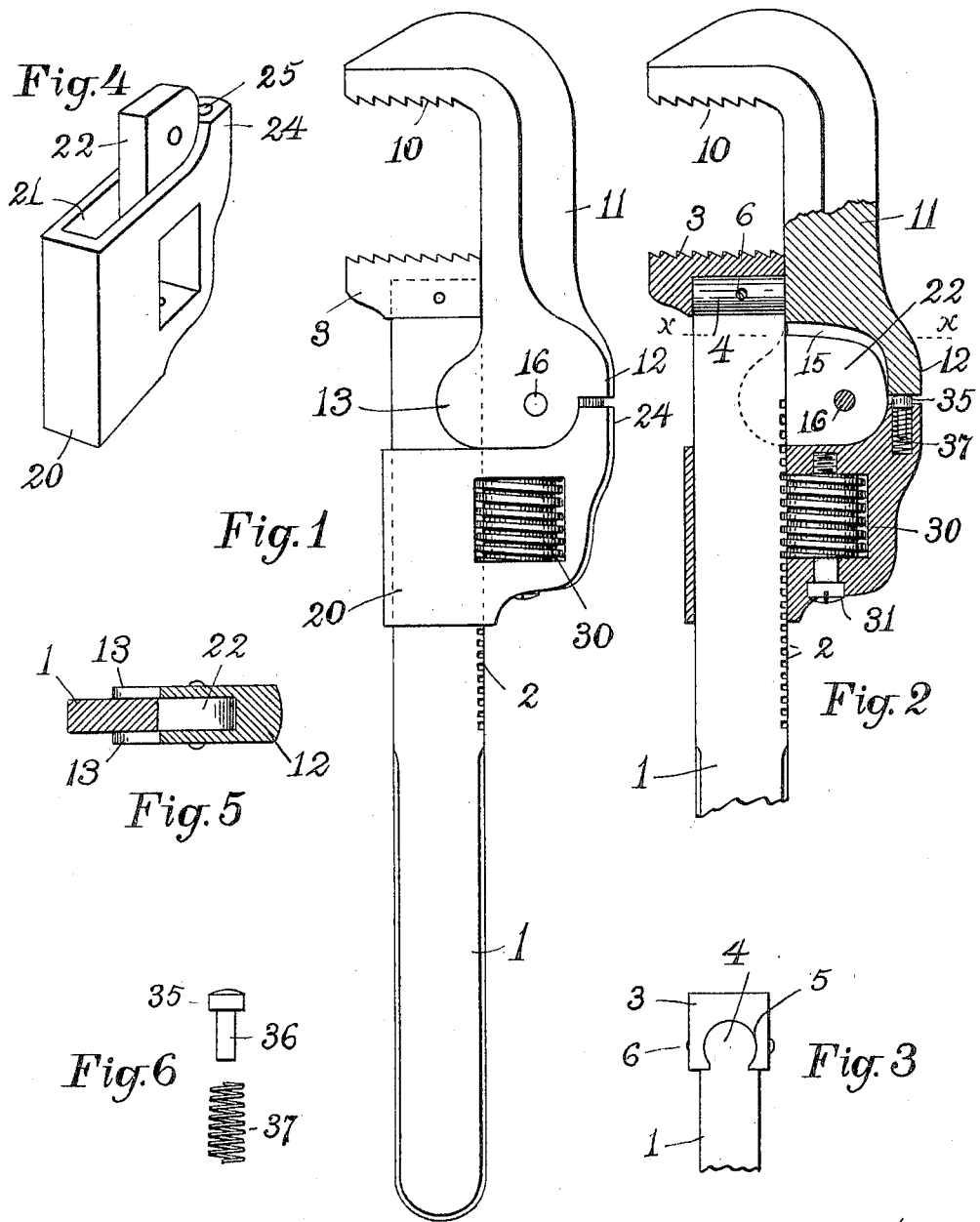

CHARLES H. THURSTON, OF WORCESTER, MASSACHUSETTS.

PIPE-WRENCH.

No. 822,407. Specification of Letters Patent. Patented June 5, 1906.

Application filed August 19, 1905. Serial No. 274,836.

*To all whom it may concern:*

Be it known that I, CHARLES H. THURSTON, a citizen of the United States, and a resident of Worcester, in the county of Worcester, State of Massachusetts, have made certain new and useful Improvements in Pipe-Wrenches, of which the following is a full, clear, and exact description.

The object of this invention is the construction of a pipe-wrench which shall be neat in appearance, inexpensive in manufacture, convenient in operation and adjustment, and especially ready in engaging and disengaging the pipe which it is to turn.

Referring to the drawings forming part of this specification, Figure 1 is a side elevation of a wrench embodying my improvements. Fig. 2 is a similar, but sectional, view. Fig. 3 is an enlarged detail view showing the manner of joining the fixed jaw to the wrench-handle. Fig. 4 is a perspective view of the slide-block forming part of the wrench. Fig. 5 is a sectional view on the line X X in Fig. 1. Fig. 6 shows the plug and spring.

In the drawings the reference-numeral 1 designates the handle of the wrench, having rack-teeth 2 along one edge and a jaw 3, fixed to its extremity. The slide-block 20 is formed with an opening 21, fitted to receive said handle, and another opening receiving the adjusting-worm 30. Rising from this block is the tongue 22, entering the mouth 15 in the shank 11 of the movable jaw 10 and pivoted therein by a suitable pin 16.

The rear of the slide-block rises a short distance at 24 nearly into contact with the shoulder 12 of the shank 11, and in said raised part or shoulder 24 is a hole 25, containing the plug 35 and coiled spring 37. To insure the better action of said plug, I prefer to form it with a stem 36, entering said spring.

The shank 11 is formed with a pair of projections or wings 13, embracing the handle 1 between them and serving to strengthen the connection between the said shank and handle.

Normally the spring and plug 37 35 by their pressure against the shoulder 12 hold the shank 11 in contact with the fixed jaw 3, while the limited space allowed between the two shoulders 12 and 24 permits the movable jaw to have a back motion in gripping the pipe being operated on. This arrangement provides a stop-action spring-joint for the movable jaw.

As shown in Fig. 2, I prefer to elongate the tongue 22 far enough up into the shank 11 to strengthen the latter against side strains, and for the sake of appearance I have the meeting surfaces of the slide-block 20 and shank 11 curved concentric with the pivot-pin 16.

To enable the handle 1 to be formed from straight commercial bar-steel, I make the jaw 3 separate therefrom and connect it thereto in the following manner: The extremity of the handle 1 is made with a cylindrical projection 4, extending transversely of the handle, while the jaw 3 is given a corresponding cylindrical groove 5, fitted to receive said projection tightly, a pin 6 serving to keep the two together. As shown in Fig. 2, the groove 5 does not extend the entire length of the jaw, but terminates at a point to provide a shoulder abutting against the outer end of said projection 4. This keeps the operating strains from being met by said pin.

I prefer to have the worm 30 left-handed, as shown, in order that its operation shall be more natural and "handy." This worm is loosely mounted on the pin 31, threaded at its inner end to hold it in place.

Another advantage in the above-described method of securing the jaw 3 to the handle is that by simply driving out the pin 6 the jaw can be removed and replaced by another, either a new one with sharper teeth or one of another type, such as smooth-faced.

What I claim as my invention, and for which I desire Letters Patent, is as follows, to wit:

The combination with a wrench-handle and fixed jaw carried thereby, of a slide-block adjustable along said handle, a tongue rising from said slide-block and having a pivot-opening through it, a shoulder rising from said slide-block to approximately the height of said opening, a movable jaw having a shank embracing and pivoted to said tongue and formed with a shoulder opposing the first-named shoulder, and a spring-pressed plug located in a hole formed in the first-named shoulder parallel with said handle.

In testimony that I claim the foregoing invention I have hereunto set my hand this 17th day of August, 1905.

CHARLES H. THURSTON.

Witnesses:
F. G. TILTON,
A. B. UPHAM.